(12) United States Patent
Hamano et al.

(10) Patent No.: US 7,510,804 B2
(45) Date of Patent: Mar. 31, 2009

(54) CATHODE MATERIAL FOR USE IN LITHIUM SECONDARY BATTERY AND MANUFACTURING METHOD THEREOF

(75) Inventors: Yoshiaki Hamano, Chuo-ko (JP);
Hidefumi Konnai, Chuo-ku (JP);
Toshihiko Funahashi, Chuo-ko (JP)

(73) Assignee: Kawatetsu Mining Co., Ltd. (JP)

( * ) Notice: Subject to any disclaimer, the term of this patent is extended or adjusted under 35 U.S.C. 154(b) by 0 days.

(21) Appl. No.: 10/165,302

(22) Filed: Jun. 7, 2002

(65) Prior Publication Data

US 2003/0031930 A1    Feb. 13, 2003

(30) Foreign Application Priority Data

Jul. 6, 2001   (JP) ............................. 2001-173285

(51) Int. Cl.
*H01M 4/58*   (2006.01)
*H01M 4/32*   (2006.01)

(52) U.S. Cl. ................. 429/231.1; 429/231.3; 429/223; 429/231.6; 429/231.9

(58) Field of Classification Search ............. 429/231.1, 429/231.3, 224, 231.95, 231.5, 231.6, 223; 252/182.1, 518.1, 519.1, 521.2; 423/594.5, 423/594.6, 599, 594.3, 594.16, 594.4; 204/291, 204/292

See application file for complete search history.

(56) References Cited

U.S. PATENT DOCUMENTS

| | | | |
|---|---|---|---|
| 6,569,569 B1 | 5/2003 | Kweon et al. | |
| 2001/0010807 A1* | 8/2001 | Matsubara | ................. 423/277 |
| 2002/0006550 A1* | 1/2002 | Yang et al. | ................. 429/223 |
| 2002/0142221 A1 | 10/2002 | Nemoto et al. | |
| 2004/0197659 A1* | 10/2004 | Kumar et al. | ............ 429/231.3 |

FOREIGN PATENT DOCUMENTS

| EP | 0 744 780 A1 | 11/1996 |
|---|---|---|
| EP | 0 944 125 A1 | 9/1999 |
| JP | 0744780 | * 11/1996 |

* cited by examiner

*Primary Examiner*—Raymond Alejandro
(74) *Attorney, Agent, or Firm*—DLA Piper LLP (US)

(57) ABSTRACT

A cathode material for use in a lithium secondary battery of excellent thermal stability contributing to the improvement of safety of the battery and having large discharging capacity, as well as a method of manufacturing the cathode material for use in the lithium secondary battery, based on the improved method for measuring the thermal stability of the cathode material, the cathode material comprising a compound represented by the chemical formula: $Li_xNi_yCo_zM_mO_2$ in which the material is powdery and the BET specific surface area is 0.8 m²/g or less, M in the chemical formula represents one or more of element selected from Ba, Sr and B, and x, y, z and m are, respectively, $0.9 \leq x \leq 1.1$, $0.5 \leq y \leq 0.95$, $0.05 \leq z \leq 0.5$ and $0.0005 \leq m \leq 0.02$.

11 Claims, 2 Drawing Sheets

CATHODE MATERIAL FOR USE IN LITHIUM SECONDARY BATTERY AND MANUFACTURING METHOD THEREOF

BACKGROUND OF THE INVENTION

1. Field of the Invention

This invention concerns a cathode material for a lithium secondary battery and, more in particular, it relates to a cathode material for a lithium secondary battery in which an alkaline earth metal or the like is blended in a composite lithium nickelate-cobaltate, as well as a manufacturing method thereof.

2. Related Art

Lithium nickelate as a cathode material for lithium/ secondary batteries has a feature that the discharging capacity is large. However, when charge/discharge are repeated, lithium nickelate in which lithium ions are deintercalated tends to undergo phase change into a state with no lithium disorder. This trend is remarkable as the working temperature of the battery is higher.

Since the phase change is an irreversible reaction, the absolute amount of the lithium nickelate that contributes as the cathode material for the cathode active material results in lowering the discharging capacity. Further, evolved oxygen tends to react with the electrolyte constituting the battery and, accordingly, it may be even lead to a risk of ignition or bursting of the battery when the working temperature is high.

In order to solve the problem, Japanese Patent Laid-Open No. 23629/2001, for example, proposes a method of evaluating the thermal stability of the lithium secondary battery by using lithium nickelate as the cathode material to form a lithium secondary battery, conducting charging/discharging operation to the secondary battery thereby causing deintercalation of lithium ions from the lithium nickelate and then conducting thermogravimetry of the lithium nickelate. Further, as a preferred active material for use in the cathode of the lithium ion secondary battery evaluated by the method described above, it discloses a composition containing Co at a ratio of 0.05 to 0.3 mol based on one mol of Ni and further containing one or more of elements selected from B, Al, Mg, Ca, Sr, Ba, Fe, Ti, Zr, Y, La and Ce by 0.001 to 0.1 mol in total.

However, it has been found as a result of the study made by the present inventors that the safety of the battery can not be evaluated satisfactorily by the existing method described above. An actual example is shown below. It is considered that oxygen gas evolves at a high temperature region near 170° C. or higher on the cathode in a state where the battery is charged, and it causes concerns that the evolved oxygen and the electrolyte constituting the battery may react. In a case of evaluating the safety of the battery whose cathode material is exposed to a high temperature by measuring the decrease of the weight of the cathode material in a temperature change from 200 to 300° C. by thermogravimetry, although swelling or ignition of the battery can be estimated based on the decomposition gas from the cathode or the electrolyte, it can not be estimated that such an abnormality will occur in the battery by the starting of reaction between the oxygen evolving from the cathode and the electrolyte. As described above, the safety of the battery can not be recognized well by the existing method described above.

SUMMARY OF THE INVENTION

This invention intends to propose a cathode material excellent in thermal stability that contributes to the improvement of the safety of the battery, as well as a manufacturing method thereof.

The cathode material for use in the lithium secondary battery according to this invention comprises a compound represented by the chemical formula: $Li_xNi_yCO_zM_mO_2$ and a lithium secondary battery having high thermal stability and large discharging capacity can be obtained by using the material. In the chemical formula described above, M is one or more of elements selected from Ba, Sr and B, x, y, z and m represent values for the molar ratio of each element and they are, respectively, $0.9 \leq x \leq 1.1$, $0.5 \leq y \leq 0.95$, $0.05 \leq z \leq 0.5$ and $0.0005 \leq m \leq 0.02$. The BET specific surface area of the cathode material is 0.8 m²/g or less, and more preferably, less than 0.5 m²/g.

The compound represented by the chemical formula $Li_xNi_yCo_zM_mO_2$ is a compound represented by the chemical formula $Li_aNi_bCo_cM_nO_2$ in the charged state, and the DTG increase start temperature is preferably 215° C. or higher. In the chemical formula described above, M is one or more of elements selected from Ba, Sr and B, and x, y, z, m, a, b, c and n are a values for the molar ratio of each element and they are, respectively, $0.9 \leq x \leq 1.1$, $0.5 \leq y \leq 0.95$, $0.05 \leq z \leq 0.5$, $0.0005 < m < 0.02$, $0.2 \leq a \leq 0.4$, $0.5 \leq b \leq 0.95$, $0.05 \leq c \leq 0.5$, and $0.0005 \leq n \leq 0.02$. The DTG increase start temperature is more preferably 230° C. or higher.

The tap density of the cathode material is preferably 1.5 g/cm³ or more, in which the amount of the cathode material filled in the battery can be increased to further increase the charging/discharging capacity per unit volume of the battery.

The cathode material for use in the lithium secondary battery can be produced by mixing a compound represented by $Ni_yCo_z(OH)_2$, a lithium salt and a salt containing the element M, heating and pulverizing them to obtain a cathode material for use in the lithium secondary battery represented by the chemical formula $Li_xNi_yCO_zM_mO_2$ in which the compound represented by $Ni_yCo_z(OH)^2$ has a tap density of 1.8 g/cm³ or more and an average particle diameter of 5 to 20 µm measured by laser diffraction method. The shape of the powdery particles of the compound represented by $Ni_yCo_z(OH)^2$ is preferably spherical. In this case, the heating is practiced preferably by successively conducting a preliminary heating at 300 to 500° C. for 2 to 6 hrs in an oxygen atmosphere, a temperature elevation step at a rate of 5 to 30° C./min after the preliminary heating and a final heating step at 650 to 900° C. for 2 to 30 hrs succeeding the temperature elevation step. In this case, the element M is one or more elements selected from Ba, Sr and B, and x, y, z and m are, respectively, $0.9 \leq x \leq 1.1$, $0.5 \leq y \leq 0.95$, $0.05 \leq z \leq 0.5$ and $0.0005 \leq m \leq 0.02$.

Further, this invention provides a lithium secondary battery in which the active cathode material comprises partially or entirely the cathode material described above.

According to this cathode material for the lithium secondary battery of this invention, the safety of the secondary battery can be improved and concern about ignition or bursting of the battery can be avoided even in a case where the secondary battery is exposed to a high temperature state.

DESCRIPTION OF THE PREFERRED EMBODIMENTS

The present inventors have found that a difference is observed for the DTG curves (Derivative Thermogravimetry: primary differentiation curves regarding the temperature of thermogravimetry curves) for the charged cathode material between each of the materials, and a cathode material which starts to DTG change at higher temperature is characteristic of excellent thermostability. Further, it has also been found to be important that the cathode material has a determined composition and can maintain a small specific surface area of the material for providing such a characteristic. This invention has been accomplished based on the findings described above.

Figure 1:
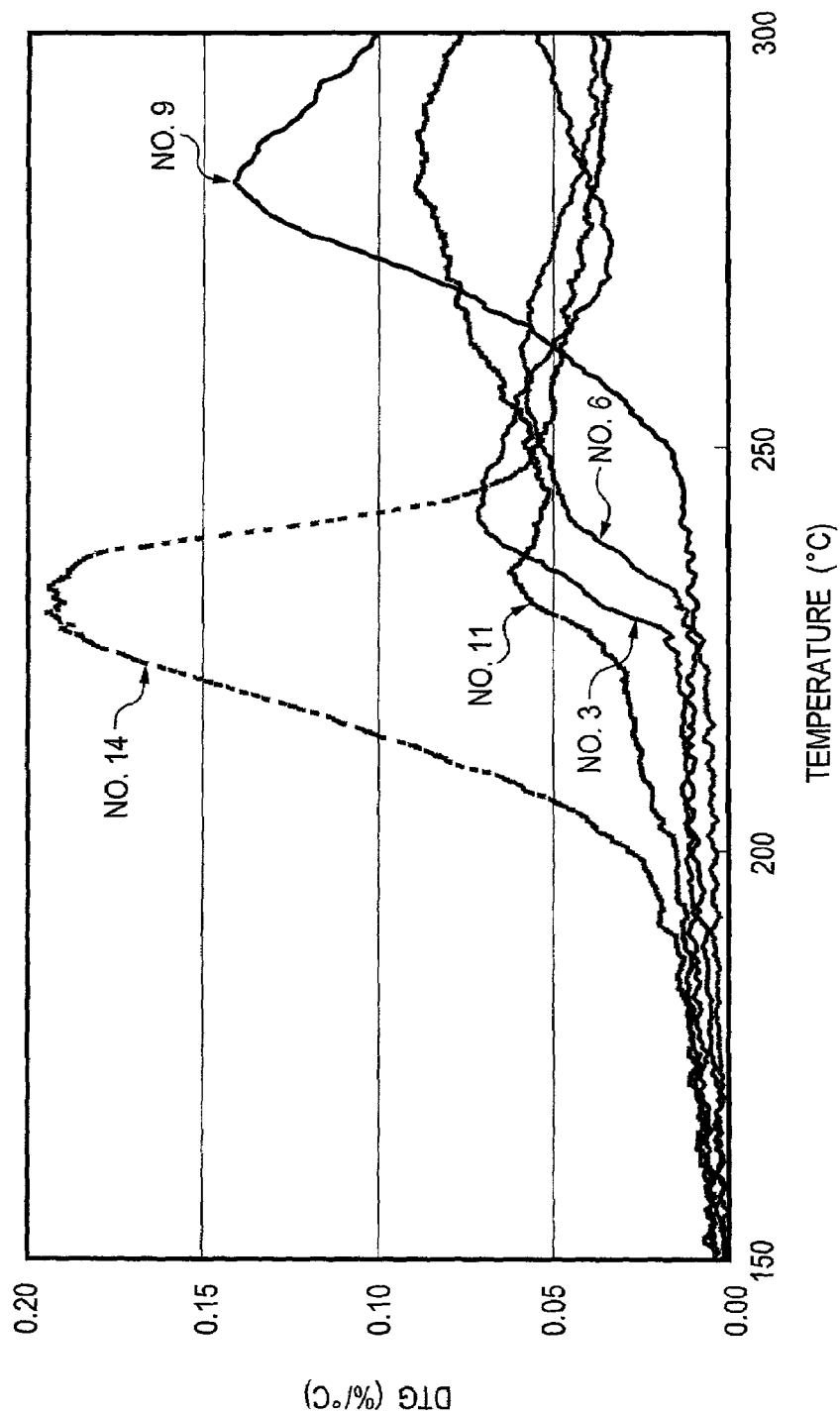
FIG. 1 is a graph showing the change of DTG when the temperature of various kinds of cathode materials for use in lithium secondary batteries in a charged state in an argon atmosphere under the condition of 10° C./min.

FIG. 1 shows DTG curves of the cathode materials for lithium secondary battery of Nos. 3, 6, 9, 11 and 14 shown in Table 1. As shown in the graph, DTG of the cathode materials starts to increase at a temperature about from 190° C. and has a peak between 220 to 290° C. The present inventors have measured DTG for a number of cathode materials and investigated the relation between the DTG increase start temperature and the safety of the battery.

5 mass % of polyvinylidene fluoride and thoroughly kneading them, it was coated to about 150 μm thickness on an aluminum substratum, and, after pressing at about 200 kg/cm$^2$, it was punched into a disk of 14 mm diameter. The disk was vacuum-dried at 150° C. for 15 hrs and used for the cathode. A lithium metal sheet was used for the anode and a porous polypropylene film (CELGARD #2400, trade name of products manufactured by Celgard Inc.) was used for the separator. Further, 1 mol of LiClO$_4$ was dissolved in 1 liter of a mixed solution at a 1:1 by volumic ratio of ethylene carbonate (EC) and dimethyl carbonate (DMC) to prepare a non-aqueous electrolyte.

They were used and assembled into a test cell in an argon-substituted globe box and charging/discharging were conducted with a current density at a constant value of 1 mA/cm$^2$ and under a voltage within a range from 2.75 to 4.2 V to measure the initial discharging capacity. After conducting the charging/discharging as described above, the cathode was taken out of the test cell in the 4.2 V charged state, the cathode material powder was peeled from the aluminum substratum, which was cleaned with dimethyl carbonate and vacuum-dried at 100° C. When the molar ratio for each of the elements of the cathode material Li$_a$Ni$_b$CO$_c$M$_n$O$_2$ for a lithium secondary battery thus obtained was calculated by chemical analysis, the molar ratio a for Li was within a range from 0.2 to 0.4 mol based on the total amount of Ni and Co. This

TABLE 2

| No. | Composition Li$_x$Ni$_y$Co$_z$M$_m$O$_2$ | DTG increase start temperature (° C.) | Initial discharging capacity (mAh/g) | Test result for High temperature storage left at 150° C., 5 hr | Nail penetration test |
|---|---|---|---|---|---|
| 1 | Li$_{1.02}$Ni$_{0.9}$Co$_{0.1}$Ba$_{0.001}$O$_2$ | 219 | 194 | No swelling, no ignition | Ignition in some battery |
| 2 | Li$_{1.02}$Ni$_{0.7}$Co$_{0.3}$Ba$_{0.001}$O$_2$ | 230 | 180 | No swelling, no ignition | No ignition |
| 3 | Li$_{1.02}$Ni$_{0.8}$Co$_{0.2}$Ba$_{0.001}$O$_2$ | 227 | 186 | No swelling, no ignition | Ignition in some battery |
| 4 | Li$_{1.02}$Ni$_{0.8}$Co$_{0.2}$Ba$_{0.001}$O$_2$ | 229 | 185 | No swelling, no ignition | Ignition in some battery |
| 5 | Li$_{0.96}$Ni$_{0.8}$Co$_{0.2}$Sr$_{0.007}$O$_2$ | 230 | 181 | No swelling, no ignition | No ignition |
| 6 | Li$_{0.99}$Ni$_{0.8}$Co$_{0.2}$Ba$_{0.002}$Sr$_{0.001}$O$_2$ | 230 | 185 | No swelling, no ignition | No ignition |
| 7 | Li$_{1.06}$Ni$_{0.8}$Co$_{0.2}$B$_{0.02}$O$_2$ | 223 | 190 | No swelling, no ignition | Ignition in some battery |
| 8 | Li$_{1.01}$Ni$_{0.8}$Co$_{0.2}$Sr$_{0.002}$O$_2$ | 224 | 184 | No swelling, no ignition | Ignition in some battery |
| 9 | Li$_{1.02}$Ni$_{0.7}$Co$_{0.3}$Ba$_{0.005}$O$_2$ | 248 | 184 | No swelling, no ignition | No ignition |
| 10 | Li$_{1.06}$Ni$_{0.8}$Co$_{0.2}$Sr$_{0.005}$O$_2$ | 225 | 185 | No swelling, no ignition | Ignition in some battery |
| 11 | Li$_{1.02}$Ni$_{0.8}$Co$_{0.2}$Ba$_{0.001}$O$_2$ | 201 | 177 | Swelling in some battery | Ignition in all battery |
| 12 | Li$_{1.02}$Ni$_{0.8}$Co$_{0.2}$Ba$_{0.001}$O$_2$ | 203 | 175 | Swelling in some battery | Ignition in all battery |
| 13 | Li$_{0.96}$Ni$_{0.8}$Co$_{0.2}$Ba$_{0.03}$O$_2$ | 220 | 150 | No swelling, no ignition | Ignition in some battery |
| 14 | Li$_{0.96}$Ni$_{0.8}$Co$_{0.2}$O$_2$ | 190 | 190 | Swelling or bursting in all battery | Ignition in all battery |
| 15 | Li$_{1.02}$Ni$_{0.7}$Co$_{0.3}$Ba$_{0.005}$O$_2$ | 203 | 169 | Swelling in some battery | Ignition in all battery |
| 16 | Li$_{1.06}$Ni$_{0.8}$Co$_{0.2}$Sr$_{0.001}$O$_2$ | 207 | 170 | Swelling in some battery | Ignition in all battery |

The measuring method for DTG and initial discharging capacity was conducted according to the following procedures. After adding N-methyl-2-pyrrolidone to 90 mass % of a cathode material powder, 5 mass % of acetylene black and powder was heated in an argon atmosphere at a rate of 10° C./min by using a thermogravimetric apparatus to measure the DTG and determine the DTG increase start temperature. The DTG increase start temperature means the temperature at which DTG exceeds 0.015%/° C. The cathode material or the compound used for the material when the cathode was taken out of the test cell in the charged state of the battery is referred to simply as the "cathode material" or the "compound in the charged state" in this specification.

The safety test for the battery was conducted as described below.
(1) N-methyl-2-pyrrolidone was added to 90 mass % of lithium nickelate composite oxide, 5 mass % of carbon black and 5 mass % of polyvinylidene fluoride to form a paste, which was coated and dried on an aluminum foil to prepare a cathode.
(2) A paste comprising a graphite powder and N-methyl-2-pyrrolidone was coated and baked on a copper foil to prepare an anode.
(3) A separator was put between the cathode and the negative electrode, and one mol of $LiPF_6$ dissolved in 1 liter of a mixed solution at 1:1 volumic ratio of ethylene carbonate (EC) and diethyl carbonate (DEC) was used as the electrolyte, to prepare a cylindrical lithium ion secondary battery of 18 mm diameter and 65 mm length.
(4) Cylindrical batteries each having an identical cathode material were manufactured by the number of 10 and each five of them was subjected to a high temperature storage test and nail penetration test.
(5) In the high temperature storage test, deformation or bursting, or absence or presence of ignition accompanying bursting of the batteries was investigated in a case of storage in a 4.2 V charged state at 150 C. for 5 hrs in an atmospheric air.
(6) In the nail penetration test, a nail of 2.5 mm diameter was penetrated through the battery in a 4.4 V charged state in atmospheric air to investigate the absence or presence of ignition from the batteries. This is a severer test than the high temperature storage test as a test regarding the safety of the battery at high temperature.

As a result, it has been found that there is a correlation between the DTG increase start temperature of the cathode material and the safety of the battery according to the evaluation standard described above as shown in Table 1. The battery having higher DTG increase start temperature is excellent in the safety of the battery. Since DTG is considered as an index of the thermal decomposition rate of the cathode material in the temperature elevation process, it is estimated that those of higher increase start temperature provided improvement for the safety of the battery. As can be seen from Table 1, the results of the high temperature storage test for battery are satisfactory in a case of the cathode material of higher DTG increase start temperature with the temperature of about 215° C. being the boundary. Further, in the nail penetration test, the results are different with respect to the DTG increase start temperature at 215 ° C. as the boundary and the results are satisfactory at 215° C. or higher. Further, in those having the DTG increase start temperature of 230° C. or higher, the results are extremely excellent. As described above, it can be estimated that the safety of the battery is improved more when the DTG increase start temperature is higher.

Figure 2:
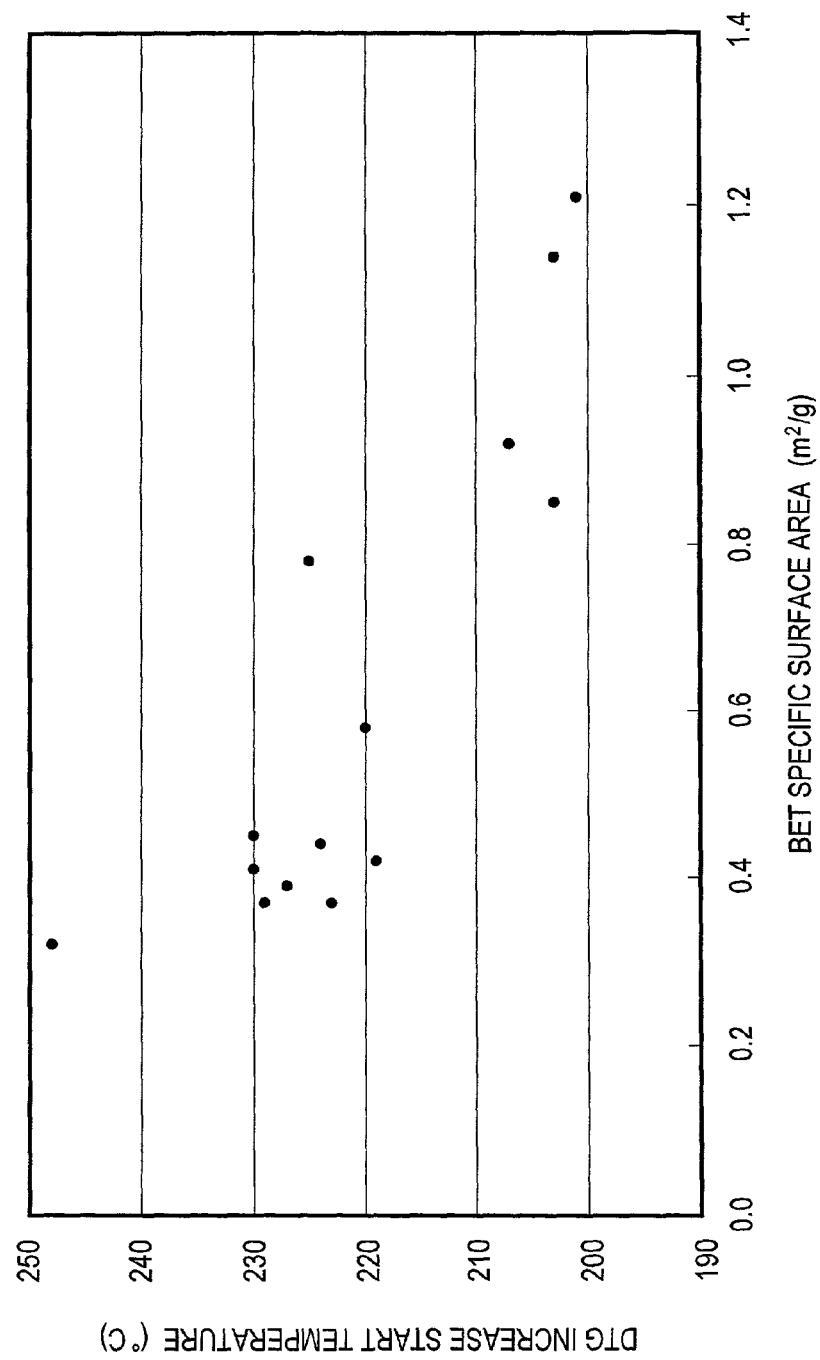
FIG. 2 is a graph showing a relation between a BET specific surface area and a DTG increase start temperature of a cathode material for use in a lithium secondary battery.

FIG. 2 is a graph showing the relation between the BET specific surface area and the DTG increase start temperature in a charged state of a cathode material for a lithium secondary battery. As shown in the graph, it can be seen that there is a close relation between the DTG increase start temperature of the cathode material for the lithium secondary battery of this type and the specific surface area thereof. When the BET specific surface area is 0.8 $m^2$/g or less, the DTG increase start temperature is 215° C. or higher. In the chemical formula described above, M is one or more of elements selected from Ba, Sr and B, and x, y, z and m are, respectively, $0.9 \leq x \leq 1.1$, $0.5 \leq y \leq 0.95$, $0.05 \leq z \leq 0.5$, and $0.0005 \leq m \leq 0.02$. The specific surface area was measured by the BET method of determining based on the adsorption amount of a nitrogen gas. The reason for defining the chemical formula $Li_xNi_yCO_zM_{mO2}$ is explained as below. At first, in this invention, the lithium nickelate of a large discharging capacity is used as a base. $LiNiO_2$ itself has high discharging capacity among cathode materials. However, it has on the other hand, a problem in view of safety. Then, 0.05 to 0.5 mol of Ni is substituted for Co to enhance the thermal stability. Improvement of the thermal stability is observed by Co at 0.05 mol or more and, on the other hand, discharging capacity is lowered if it is 0.5 mol or more. Further, B, Sr or Ba is blended at a ratio of 0.0005 to 0.02 mol based on the total amount of Ni and Co to improve the thermal stability and obtain a sufficient discharging capacity. The improvement for the thermal stability by the element is insufficient when it is less than 0.0005 mol, whereas the discharging capacity is lowered when it is 0.02 mol or more. When Li is insufficient, this results in a crystal structure with high lithium disorder and lowers the discharging capacity. Further if Li is excessive, it forms hydrates or carbonates, which are gelled upon manufacture of the electrode. A satisfactory paste state is not obtained and worsens the handlability. Accordingly, Li is defined within a range from 0.9 to 1.1 mol based on the total amount of Ni and Co.

In the invention described above, for increasing the discharging capacity per unit volume of the battery by increasing the amount of the cathode material to be filled in the battery, the tap density is preferably 1.5 g/$cm^3$ or more. The tap density was measured by using a powder tester manufactured by Hosokawa Micron Co. and applying tapping for 200 times by using a 100 ml vessel for use in tap density measurement.

The cathode material for the lithium secondary battery described above can be manufactured as described below. At first, a high density $Ni_yCo_z(OH)_2$ in which the ratio of Co is controlled to 0.05 to 0.5 mol based on the total amount of Ni and Co as the starting material is prepared. Upon preparation thereof $Ni_yCo_z(OH)_2$ is prepared, for example, by a wet solution synthesis method in which the average particle diameter is controlled to 5 - 20 μm and the tap density is controlled to be 1.8 g/$cm^3$ or more. Each of the particles is desirably a spherical shape. In a case of synthesizing lithium - nickelate composite oxide, since the shape of $Ni_yCo_z(OH)_2$ as the starting material remains as it is, it is desirable to prepare the starting material as described above to obtain a cathode material of a small specific surface area and a high tap density according to this invention. After mixing the spherical and dense $Ni_yCo_z(OH)_2$, a lithium salt and an M-containing salt, they are heated and pulverized to obtain a cathode material for use in the lithium secondary battery represented by the chemical formula $Li_xNi_yCO_zM_mO_2$ in which it is preferred to set the heating conditions to conduct a preliminary heating at a temperature of 300 to 500° C. for 2 to 6 hrs in an oxygen atmosphere, a temperature elevation process at 5 to 30° C./min after the preliminary heating and a final heating process at a temperature of 650 to 900° C. for 2 to 30 hrs succeeding the temperature elevation process. M is one or more of elements selected from Ba, Sr and B. Since the preliminary heating is applied with an aim of completely removing the water content of the water of crystallization in the starting material while suppressing reactions between lithium and nickel, it is preferred to keep the temperature at 300 to 500° C. for 2 hrs or more. Since it was confirmed that water can be removed thoroughly at 6 hrs or less, it is not necessary that the process exceeds 6 hrs in view of productivity. The temperature elevation rate in the temperature elevation process is preferably 5 to 30° C./min in view of the protection of the heating crucible or refractory for heating and in view of productivity. Further, the temperature for the final heating is preferably from 650° C. to 900° C. The reaction proceeds slowly at a temperature lower than 650° C., whereas scattering of lithium is caused at a temperature in excess of 900° C. The retention time is preferably from 2 to 30 hrs in view of the reactivity and the productivity.

EXAMPLE

Cathode materials having the composition of the general formula $Li_xNi_yCO_zM_mO_2$ shown in Table 2 were prepared and specific surface area, tap density, discharging capacity and DTG increase start temperature thereof were measured. Finely powderous reagents were used as the starting material for Nos. 11, 12, 15 and 16. Dense spherical $Ni_yCo_z(OH)_2$ with the tap density of 1.9 to 2.1 g/cm$^3$ was used for other sample numbers as starting materials. As the heating condition, short time heating or long time heating described below in an oxygen atmosphere was adopted. The resUlt of measurement is shown in Table 2.

| Short Time Heating | |
|---|---|
| Preliminary heating | kept at 400° C. for 4 hrs |
| Temperature elevation rate | 10° C./min |
| Final heating | kept at 800° C. for 4 hrs |
| Long Time Heating | |
| Preliminary heating | kept at 500° C. for 6 hrs |
| Temperature elevation rate | 20° C./min |
| Final heating | kept at 750° C. for 12 hrs |

The specific surface area was measured by the so-called "BET method."

While this invention has been described with reference to several embodiments, it should be construed that such embodiments are only for the purpose of specifically explaining the invention and do not restrict the invention. After studying the present specification, various modifications equivalent materials or substitution of technique will occur to those skilled in the art. All such modifications and substitutions are considered to fall within the scope of the present claims.

What is claimed is:

1. A cathode material for use in a lithium secondary battery comprising a compound represented by the chemical formula: $Li_xNi_yCo_zM_mO_2$ when not in a charged state, having high thermal stability and large discharging capacity in which M is selected from the group consisting of Ba and Ba with Sr, and x, y, z and m are values for the molar ratio of each element: $0.9 \leq x \leq 1.1$, $0.5 \leq y \leq 0.95$, $0.05 \leq z \leq 0.5$ and $0.0005 \leq m \leq 0.005$, wherein the compound represented by the chemical formula: $Li_xNi_yCo_zM_mO_2$ when not in a charged state changes to a compound when in a charged state represented by the chemical formula: $Li_aNi_bCo_cM_nO_2$ and a, b, c and n are values for the molar ratio of each element and are, respectively, $0.2 \leq a \leq 0.4$, $0.5 \leq b \leq 0.95$, $0.05 \leq c \leq 0.5$, and $0.0005 \leq n \leq 0.005$ and the material is powdery, has a BET specific surface area 0.8 m$^2$/g or less and has a DTG increase start temperature at 215° C. or higher.

2. The cathode material defined in claim 1, wherein the BET specific surface area is less than 0.5 m$^2$/g.

3. The cathode material defined in claim 1, wherein the compound represented by the chemical formula: $Li_xNi_yCo_zM_mO_2$ has a tap density of 1.5 g/cm$^3$ or more.

4. A lithium secondary battery containing the cathode material defined in claim 1.

5. A method of manufacturing a cathode material comprising a powdery compound represented by the chemical formula: $Li_xNi_yCo_zM_mO_2$, which M is Ba or Ba with Sr, and x,

TABLE 2

| No. | Ni—Co hydrates Tap density (g/cm$^3$) | Average particle diameter (μm) | Composition $Li_xNi_yCo_zM_mO_2$ | Heating time | Specific surface area (m$^2$/g) | Tap density (g/cm$^3$) | Discharge capacity (mAh/g) | DTG increase start temperature (° C.) |
|---|---|---|---|---|---|---|---|---|
| 1 | 2.0 | 11.3 | $Li_{1.02}Ni_{0.9}Co_{0.1}Ba_{0.001}O_2$ | Short time | 0.42 | 2.1 | 194 | 219 |
| 2 | 1.9 | 11.8 | $Li_{1.02}Ni_{0.7}Co_{0.3}Ba_{0.001}O_2$ | Short time | 0.41 | 2.0 | 180 | 230 |
| 3 | 2.1 | 10.2 | $Li_{1.02}Ni_{0.8}Co_{0.2}Ba_{0.001}O_2$ | Short time | 0.39 | 2.1 | 186 | 227 |
| 4 | 2.1 | 10.2 | $Li_{1.02}Ni_{0.8}Co_{0.2}Ba_{0.001}O_2$ | Long time | 0.37 | 2.1 | 185 | 229 |
| 5 | 2.1 | 10.2 | $Li_{0.96}Ni_{0.8}Co_{0.2}Sr_{0.007}O_2$ | Short time | 0.45 | 2.1 | 181 | 230 |
| 6 | 2.1 | 10.2 | $Li_{0.99}Ni_{0.8}Co_{0.2}Ba_{0.002}Sr_{0.001}O_2$ | Short time | 0.41 | 2.1 | 185 | 230 |
| 7 | 2.1 | 10.2 | $Li_{1.06}Ni_{0.8}Co_{0.2}B_{0.02}O_2$ | Short time | 0.37 | 2.2 | 190 | 223 |
| 8 | 2.1 | 10.2 | $Li_{1.01}Ni_{0.8}Co_{0.2}Sr_{0.002}O_2$ | Short time | 0.44 | 2.1 | 184 | 224 |
| 9 | 2.1 | 10.2 | $Li_{1.02}Ni_{0.7}Co_{0.3}Ba_{0.005}O_2$ | Long time | 0.32 | 2.2 | 184 | 248 |
| 10 | 2.1 | 10.2 | $Li_{1.06}Ni_{0.8}Co_{0.2}Sr_{0.005}O_2$ | Longtime | 0.78 | 2.1 | 185 | 225 |
| 11 | 1.6 | 27.2 | $Li_{1.02}Ni_{0.8}Co_{0.2}Ba_{0.001}O_2$ | Short time | 1.21 | 1.4 | 177 | 201 |
| 12 | 1.7 | 25.6 | $Li_{1.02}Ni_{0.8}Co_{0.2}Ba_{0.001}O_2$ | Long time | 1.14 | 1.5 | 175 | 203 |
| 13 | 2.1 | 10.2 | $Li_{0.96}Ni_{0.8}Co_{0.2}Ba_{0.03}O_2$ | Short time | 0.58 | 1.7 | 150 | 220 |
| 14 | 2.1 | 10.2 | $Li_{0.96}Ni_{0.8}Co_{0.2}O_2$ | Short time | 0.38 | 2.1 | 190 | 190 |
| 15 | 1.6 | 27.2 | $Li_{1.02}Ni_{0.7}Co_{0.3}Ba_{0.005}O_2$ | Long time | 0.85 | 1.5 | 169 | 203 |
| 16 | 1.6 | 27.2 | $Li_{1.06}Ni_{0.8}Co_{0.2}Sr_{0.001}O_2$ | Long time | 0.92 | 1.5 | 170 | 207 |

As shown in the table, the cathode materials having the composition of the invention and having the determined specific surface area have large discharging capacity and high DTG increase start temperature. Further, when the tap density is large, the amount of the cathode material that can be filled in the battery can be increased and the charging/discharging capacity per unit volume of the battery can be increased.

y, z and m are values for the molar ratio of each element: $0.9 \leq x \leq 1.1$, $0.5 \leq y \leq 0.95$, $0.05 \leq z \leq 0.5$ and $0.0005 \leq m \leq 0.02$, having a BET specific surface area 0.8 m$^2$/g or less, comprising:

mixing only by a dry mixing process a powder of a compound represented by $Ni_yCo_z(OH)_2$ having a tap density 1.8 g/cm$^3$ or more and an average particle diameter of 5 to 20 µm, a lithium salt and a salt containing the element M to form a dry mixture, and forming the cathode material by heating and pulverizing the dry mixture.

6. The method defined in claim 5, wherein powdery particles of the compound represented by $Ni_yCo_z(OH)_2$ have a spherical shape.

7. The method defined in claim 5, wherein heating includes conducting successively preliminary heating at 300 to 500° C. for 2 to 6 hrs in an oxygen atmosphere, a temperature elevation process of elevating the temperature at a rate of 5 to 30C/min after the preliminary heating and final heating at 650 to 900° C. for 2 to 30 hrs succeeding temperature elevation.

8. A cathode material for use in a lithium secondary battery comprising a compound represented by the chemical formula: $Li_xNi_yCo_zM_mO_2$ having high thermal stability and large discharging capacity in which M is Ba or Ba with Sr, and x, y, z and m are values for the molar ratio of each element $0.9 \leq x \leq 1.1$, $0.5 \leq y \leq 0.95$, $0.05 \leq z \leq 0.5$ and $0.0005 \leq m \leq 0.005$, wherein the material is powdery, has a BET specific surface area $0.8\ m^2/g$ or less, and has a DTG increase start temperature of 230° C. or higher in a charged state.

9. The cathode material defined in claim 8, wherein the BET specific surface area is less than $0.5\ m^2/g$.

10. The cathode material defined in claim 8, wherein the compound represented by the chemical formula: $Li_xNi_yCo_zM_mO_2$ has a tap density of $1.5\ g/cm^3$ or more.

11. A lithium secondary battery containing the cathode material defined in claim 8.

* * * * *

UNITED STATES PATENT AND TRADEMARK OFFICE
CERTIFICATE OF CORRECTION

PATENT NO.         : 7,510,804 B2
APPLICATION NO. : 10/165302
DATED                : March 31, 2009
INVENTOR(S)      : Hamano et al.

It is certified that error appears in the above-identified patent and that said Letters Patent is hereby corrected as shown below:

<u>On the Title Page, Item (30) For. Appl. Pri Data</u>
Please change "Jul. 6, 2001" to -- June 7, 2001 --.

<u>In Column 2</u>
At line 36, please change "$(OH)^2$" to -- $(OH)_2$ --; and at line 39, please change "$(OH)^2$" to -- $(OH)_2$ --.

<u>In Column 6</u>
At line 3, please change "$0.05 \leq z \leq 0\ 5$" to -- $0.05 \leq z \leq 0.5$ --.

<u>In Column 10</u>
At line 3, please change "element0.9" to -- element: 0.9 --.

Signed and Sealed this

Thirtieth Day of June, 2009

JOHN DOLL
*Acting Director of the United States Patent and Trademark Office*